United States Patent
Ochi

(10) Patent No.: US 9,155,407 B2
(45) Date of Patent: *Oct. 13, 2015

(54) FACILITY COMPRISING FOOD AND DRINK INFRASTRUCTURE, AND METHOD OF ATTRACTING CUSTOMERS TO FACILITY

(75) Inventor: Yasushi Ochi, Kaizuka (JP)

(73) Assignee: BLD Oriental Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/814,643

(22) PCT Filed: Jul. 4, 2011

(86) PCT No.: PCT/JP2011/003809
§ 371 (c)(1),
(2), (4) Date: Feb. 6, 2013

(87) PCT Pub. No.: WO2012/020535
PCT Pub. Date: Feb. 16, 2012

(65) Prior Publication Data
US 2013/0133556 A1     May 30, 2013

(30) Foreign Application Priority Data

Aug. 11, 2010   (JP) .................................. 2010-180083

(51) Int. Cl.
*E04H 3/04*     (2006.01)
*A47F 10/06*     (2006.01)
(Continued)

(52) U.S. Cl.
CPC ................. *A47F 10/06* (2013.01); *A47B 11/00* (2013.01); *A63G 1/10* (2013.01); *A63G 31/02* (2013.01); *B60P 3/025* (2013.01); *B60P 3/0257* (2013.01); *E04H 3/02* (2013.01); *E04H 3/04* (2013.01)

(58) Field of Classification Search
CPC ............. A63G 1/44; A63G 1/30; A63G 1/46; A63G 1/24; A63G 1/12; A63G 1/22; A63G 1/10; A63G 1/08; A63G 27/02; A63G 27/00; A63G 27/08; A63G 27/06; A63G 1/00; A63G 1/06; A63G 31/00; A63G 31/16; A63G 7/00; A63G 31/007; A63B 2208/12; A63B 22/08; A63B 22/14; A63B 26/003; A47D 9/02; A47D 13/10; B60P 3/0257; E04H 3/02

USPC ............. 186/40, 42, 45, 7, 27, 28, 35, 36, 38, 186/52; 472/2, 26, 29, 30, 33, 35, 41, 21, 472/59

See application file for complete search history.

(56) References Cited

U.S. PATENT DOCUMENTS 1,417,061 A * 5/1922 Hansley ........................... 40/456
1,586,487 A * 5/1926 Thixton ..................... 297/157.1
(Continued)

FOREIGN PATENT DOCUMENTS

EP           2058030 A1    5/2009
JP         111677/1977 U    3/1979
(Continued)

OTHER PUBLICATIONS

Byron, Blog, Pedal Pub, Feb. 6, 2007, http://www.bikehugger.com/post/view/a-team-bike.*
(Continued)

*Primary Examiner* — Jeffrey Shapiro
(74) *Attorney, Agent, or Firm* — Stevens & Showalter, LLP

(57) ABSTRACT

To provide either a facility comprising a plurality of stores that offer food and drink, and that treats customer seating for the plurality of stores as a shared space, or a method of attracting customers to said facility. This facility comprises: a traveling wheeled vehicle, which is capable of carrying customers on a tour of the shared space; and rotating tables. The rotating tables are configured such that tables are positioned upon rotating devices. The rotating devices comprise upper rotating bodies, further comprising central gears which are positioned in the centers of bases. The rotating devices further comprise: drive motors that are capable of rotationally driving the central gears; and casters that support the upper rotating bodies. The traveling wheeled vehicle and the rotating tables are positioned in the shared space.

10 Claims, 7 Drawing Sheets

(51) Int. Cl.
  *B60P 3/025* (2006.01)
  *E04H 3/02* (2006.01)
  *A47B 11/00* (2006.01)
  *A63G 31/02* (2006.01)
  *A63G 1/10* (2006.01)

(56) References Cited

U.S. PATENT DOCUMENTS

| | | | | |
|---|---|---|---|---|
| 1,626,904 | A * | 5/1927 | Zabel | 472/6 |
| 2,206,172 | A * | 7/1940 | Estes | 472/31 |
| 2,405,108 | A * | 8/1946 | Brown | 472/47 |
| 2,409,805 | A * | 10/1946 | Shikles | 297/158.2 |
| 2,559,768 | A * | 7/1951 | Howard | 472/30 |
| 2,819,899 | A | 1/1958 | Thumberg | |
| 3,189,343 | A * | 6/1965 | Beirer, Jr. | 472/42 |
| 3,219,344 | A * | 11/1965 | Tober | 273/441 |
| 3,480,272 | A * | 11/1969 | Ziebart | 472/20 |
| 3,498,604 | A * | 3/1970 | Schwarzkopf | 472/39 |
| 3,506,260 | A * | 4/1970 | Johnson | 472/29 |
| 3,554,360 | A * | 1/1971 | Bildsoe | 198/833 |
| 3,575,265 | A * | 4/1971 | Simjian | 186/49 |
| 3,661,386 | A * | 5/1972 | Green | 472/24 |
| 3,758,108 | A * | 9/1973 | Tada | 472/5 |
| 4,720,140 | A * | 1/1988 | Change, III | 297/217.7 |
| 4,792,700 | A * | 12/1988 | Ammons | 290/55 |
| 4,805,898 | A | 2/1989 | Jacober et al. | |
| 4,811,506 | A * | 3/1989 | Mehta | 40/427 |
| 4,987,787 | A * | 1/1991 | Hou | 74/49 |
| 5,018,973 | A * | 5/1991 | Alet et al. | 434/62 |
| 5,255,461 | A * | 10/1993 | Chiou | 40/415 |
| 5,395,290 | A | 3/1995 | Knijpstra | |
| 5,407,393 | A | 4/1995 | Schmidt | |
| 5,479,668 | A * | 1/1996 | Cooper et al. | 5/656 |
| 5,775,033 | A * | 7/1998 | Meehan | 52/33 |
| 5,810,641 | A * | 9/1998 | Lo | 446/325 |
| 6,161,341 | A * | 12/2000 | Anderson | 52/68 |
| 6,220,965 | B1 * | 4/2001 | Hanna et al. | 463/52 |
| 6,328,658 | B1 * | 12/2001 | Gnezdilov | 472/32 |
| 6,582,315 | B1 | 6/2003 | Formanski | |
| 6,632,092 | B2 * | 10/2003 | Moran | 434/55 |
| 7,959,513 | B2 * | 6/2011 | Ochi | 472/29 |
| 8,313,388 | B2 * | 11/2012 | Ochi | 472/29 |
| 8,348,776 | B2 * | 1/2013 | Crawford et al. | 472/43 |
| 8,505,245 | B2 * | 8/2013 | Bobryshev et al. | 52/64 |
| 8,602,902 | B2 * | 12/2013 | Ochi | 472/40 |
| 8,608,582 | B2 | 12/2013 | Ochi | |
| 8,795,094 | B2 * | 8/2014 | Ochi | 472/6 |
| 2001/0037915 | A1 * | 11/2001 | Abekawa | 186/7 |
| 2001/0044342 | A1 * | 11/2001 | Armstrong | 472/59 |
| 2003/0183456 | A1 * | 10/2003 | Hatzor | 186/39 |
| 2009/0012122 | A1 | 1/2009 | Branch et al. | |
| 2010/0048310 | A1 | 2/2010 | Ochi | |
| 2012/0006221 | A1 * | 1/2012 | Crawford et al. | 104/53 |
| 2012/0225728 | A1 | 9/2012 | Ochi | |
| 2013/0090176 | A1 | 4/2013 | Ochi | |
| 2013/0095935 | A1 | 4/2013 | Ochi | |

FOREIGN PATENT DOCUMENTS

| | | |
|---|---|---|
| JP | 139254/1978 U | 4/1980 |
| JP | 125903/1982 U | 4/1984 |
| JP | 62-129072 A | 6/1987 |
| JP | 73404/1989 U | 2/1991 |
| JP | 4-15989 U | 2/1992 |
| JP | 05-098821 A | 4/1993 |
| JP | H07-098782 | 4/1995 |
| JP | 7-34898 U | 6/1995 |
| JP | 7-265548 A | 10/1995 |
| JP | 8-38649 A | 2/1996 |
| JP | 8-211330 A | 8/1996 |
| JP | H08-196747 | 8/1996 |
| JP | 8-229244 A | 9/1996 |
| JP | 2009108449 A | 4/1997 |
| JP | H11-299635 | 11/1999 |
| JP | 2000-116959 A | 4/2000 |
| JP | 2000167254 | 6/2000 |
| JP | 2000197715 | 7/2000 |
| JP | 2001-169864 A | 6/2001 |
| JP | 2004-208844 A | 7/2004 |
| JP | 2005-52305 A | 3/2005 |
| JP | 2005-131215 A | 5/2005 |
| JP | 2006037435 A | 2/2006 |
| JP | 2008067741 A | 3/2008 |
| JP | 2008073497 A | 4/2008 |
| JP | 2008536082 A | 9/2008 |
| JP | 2008231904 A | 10/2008 |
| JP | 200911421 A | 1/2009 |
| WO | 2006025108 A1 | 3/2006 |
| WO | 2008032687 A1 | 3/2008 |

OTHER PUBLICATIONS

International Search Report; International Application No. PCT/JP2011/003809; Sep. 13, 2011; Japanese Patent Office.

International Search Report; Application No. PCT/JP2010/002877; Jun. 22, 2010; Japanese Patent Office.

Naoki Turuoka; Written Opinion of the International Searching Authority; Application No. PCT/JP2010/002877; Jun. 22, 2010; Japanese Patent Office.

Ochi, Yasushi; U.S. Appl. No. 13/497,070, filed Apr. 21, 2010 I.A. Date; entitled Tree-Shaped Decoration Apparatus.

Ochi, Yasushi; U.S. Appl. No. 13/497,085, filed Apr. 21, 2010 I.A. Date; entitled Slide Device.

Ochi, Yasushi; U.S. Appl. No. 13/497,116, filed Apr. 21, 2010 I.A. Date; entitled Rocking Play Device.

Ochi, Yasushi; U.S. Appl. No. 13/497,095, filed Apr. 21, 2010 I.A. Date; entitled Amusement Apparatus.

Ochi, Yasushi; U.S. Appl. No. 13/497,102, filed Apr. 21, 2010 I.A. Date; entitled Amusement Apparatus.

International Search Report; Application No. PCT/JP2010/002878; May 25, 2010; Japanese Patent Office.

Yosiaki Usui; Written Opinion of the International Searching Authority; Application No. PCT/JP2010/002878; May 25, 2010; Japanese Patent Office.

International Search Report; Application No. PCT/JP2010/002875; Jun. 1, 2010; Japanese Patent Office.

International Search Report; Application No. PCT/JP2010/002873; Jun. 8, 2010; Japanese Patent Office.

Tamotu Sakaii; Written Opinion of the International Searching Authority; Application No. PCT/JP2010/002873; Jun. 8, 2010; Japanese Patent Office.

International Search Report; Application No. PCT/JP2010/002872; Jun. 1, 2010; Japanese Patent Office.

Makoto Suzuki; Written Opinion of the International Searching Authority; Application No. PCT/JP2010/002872; Jun. 1, 2010; Japanese Patent Office.

International Search Report; Application No. PCT/JP2010/002876; Jul. 6, 2010; Japanese Patent Office.

Tuneaki Oota; Written Opinion of the International Searching Authority; Application No. PCT/JP2010/002876; Jul. 6, 2010; Japanese Patent Office.

* cited by examiner (A)

(B)

FACILITY COMPRISING FOOD AND DRINK INFRASTRUCTURE, AND METHOD OF ATTRACTING CUSTOMERS TO FACILITY

TECHNICAL FIELD

This Invention relates to a facility comprising food and drink infrastructure and method of attracting customers to the facility.

BACKGROUND ART

Currently, the facilities such as food courts (meaning an indoor space for providing a variety of adjacent restaurant booths and a shared space for self-service meals, the same shall apply hereinafter) are spreading rapidly in a shopping mall and an airport. Because seats can be commonly used by dividing the shop by each menu regarding the cuisine, every shop doesn't need the seats. Furthermore, it is used by many families because the seat portion (hereinafter called a sharing space) can be set widely.

SUMMARY OF THE INVENTION

Problem Invention is to Solve

Because the conventional food court offers the cuisine of various genres, the sharing space must have an average design. Therefore, there was a high tendency that customers will soon tire of it. On the other hand, many customers coming to the food court have a family, so if a facility for keeping the interest of a child is installed in the sharing space for a child, it will become frequent to come to the food court. An object of the present invention is to make available a facility capable of making the further more interesting to customers, and method of attracting customers to the facility, in the facilities where a plurality of stores have shared seating (sharing space).

Means for Resolving the Problem

This Invention to achieve the object is a method of attracting customers to a facility comprising a plurality of stores that offer food and drink, and that treats customer seating for the plurality of stores as a shared space. A method of attracting customers to a facility of this invention is provided with a step of placing a traveling wheeled vehicle capable of carrying customers on a tour of the shared space and provided with a step of placing a rotating table. The rotating tables are configured such that tables are positioned upon rotating devices. The rotating devices comprise upper rotating bodies, further comprising central gears which are positioned in the centers of bases. The rotating devices further comprise a drive motor capable of rotationally driving the central gears, and casters that support the upper rotating body. The rotating table is configured by placing a table and a chair to the rotating device, the traveling wheeled vehicle and the rotating tables are positioned in the shared space.

By above configuration, the upper rotation body rotates by the center gear rotated by center gear drive motor. Furthermore, by a caster's supporting the load coming from the upper part, the small rotation device strong about weight coming from the upper part can be easily configured thus without a complicated mechanism. Furthermore, by placing the traveling wheeled vehicle in the sharing space, customers become able to board the traveling wheeled vehicle. In accordance with an aspect of the present invention, the drive motor may be fixed to the sharing space. Alternatively, a lower rotating body for fixing the above drive motor is provided to the rotating device, an upper rotating body is stacked in the lower rotating body while aligning their central axes. And, placing a caster for supporting the upper rotating body to the lower rotation body, in the state a wheel of the caster upturned.

In accordance with an aspect of the present invention, customers become able to eat in the vehicle by employing the table to the traveling wheeled vehicle. Furthermore, a crank placed in the center of top surface of the base substrate in lieu of the central gear, and rotating shaft for pivotally supporting the crank can be rotationally driven by a drive motor, thus the upper rotating body makes eccentric rotating.

Another invention to achieve the object is a facility comprising a plurality of stores that offer food and drink, and that treats customer seating for the plurality of stores as a shared space. And, this facility comprises a traveling wheeled vehicle which is capable of carrying customers on a tour of the shared space and comprises a rotating table. The rotating devices comprise a base substrate and comprise an upper rotating bodies comprising central gears which are positioned in the centers of base substrate. And, the rotating devices further comprise a drive motor capable of rotationally driving the central gears, and casters that support the upper rotating body. The rotating table is configured by placing a table to the rotating device, and the traveling wheeled vehicle and the rotating tables are positioned in the shared space.

In accordance with an aspect of the present invention, the drive motor may be fixed to the sharing space. Alternatively, a lower rotating body for fixing the above drive motor is provided to the rotating device, and the upper rotating body is stacked in the lower rotating body while aligning their central axes. And, placing a caster for supporting the upper rotating body to the lower rotation body, in the state a wheel of the caster upturned. In accordance with an aspect of the present invention, a table may be comprised in the traveling wheeled vehicle. Furthermore, a crank placed in the center of top surface of the base substrate in lieu of the central gear, and rotating shaft for pivotally supporting the crank can be rotationally driven by a drive motor, thus the upper rotating body makes eccentric rotating.

In accordance with an aspect of the present invention, a slip ring for supplying electric power to the playground equipment may be provided. Even if rotating device for playground equipments rotates, electric power is supplied to a playground equipment placed in the rotation device upper part. Furthermore, a torque limiter may be mounted in the rotation axis of the drive motor, for controlling a driving torque of the rotation axis within predetermined value.

A playground equipment may be placed in the sharing space. For example, the playground equipment such as climbing equipment, rotary playground equipment, iron rods, slide, swing, jungle gyms, aerial ladders, and seesaws and combination of playground equipment may be placed in the facility which placed in the sharing space of the present invention or method of attracting customers to a facility.

Effects of the Invention

This invention is a facility comprising a plurality of stores that offer food and drink, and that treats customer seating for the plurality of stores as a shared space, or a method of attracting customers to the facility. And, this facility comprises a traveling wheeled vehicle, which is capable of carrying customers on a tour of the shared space and further comprises a rotating table. The rotating devices comprise a base substrate and comprise an upper rotating body comprising central gears which are positioned in the centers of base substrate. The rotating devices further comprise a drive motor capable of rotationally driving the central gears, and casters that support the upper rotating body. The rotating table is configured by placing a table and a chair to the rotating device, and the traveling wheeled vehicle and the rotating tables are positioned in the shared space.

By above configuration, the upper rotation body rotates by the center gear rotated by center gear drive motor. Furthermore, by a caster's supporting the load coming from the upper part, the small rotation device strong about weight coming from the upper part can be easily configured thus without complicated mechanism. Furthermore, by placing the traveling wheeled vehicle in the sharing space, customers become able to board traveling wheeled vehicle, so the customers of families can be attracted in facility of this Invention coming with the aim of above rotating table and traveling wheeled vehicle.

DESCRIPTION OF THE PREFERRED EMBODIMENT

Figure 1:
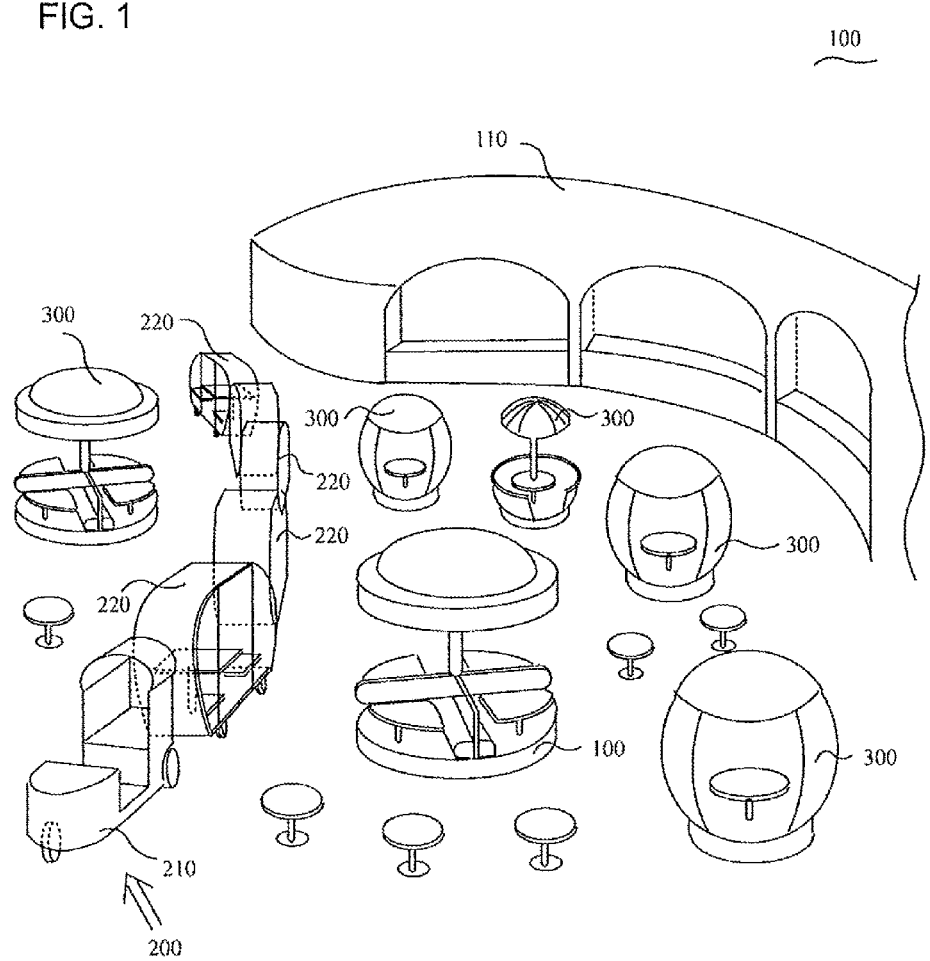
FIG. 1 is a perspective view illustrating outlined configuration of facility in accordance with an embodiment of the present invention.
Figure 2:
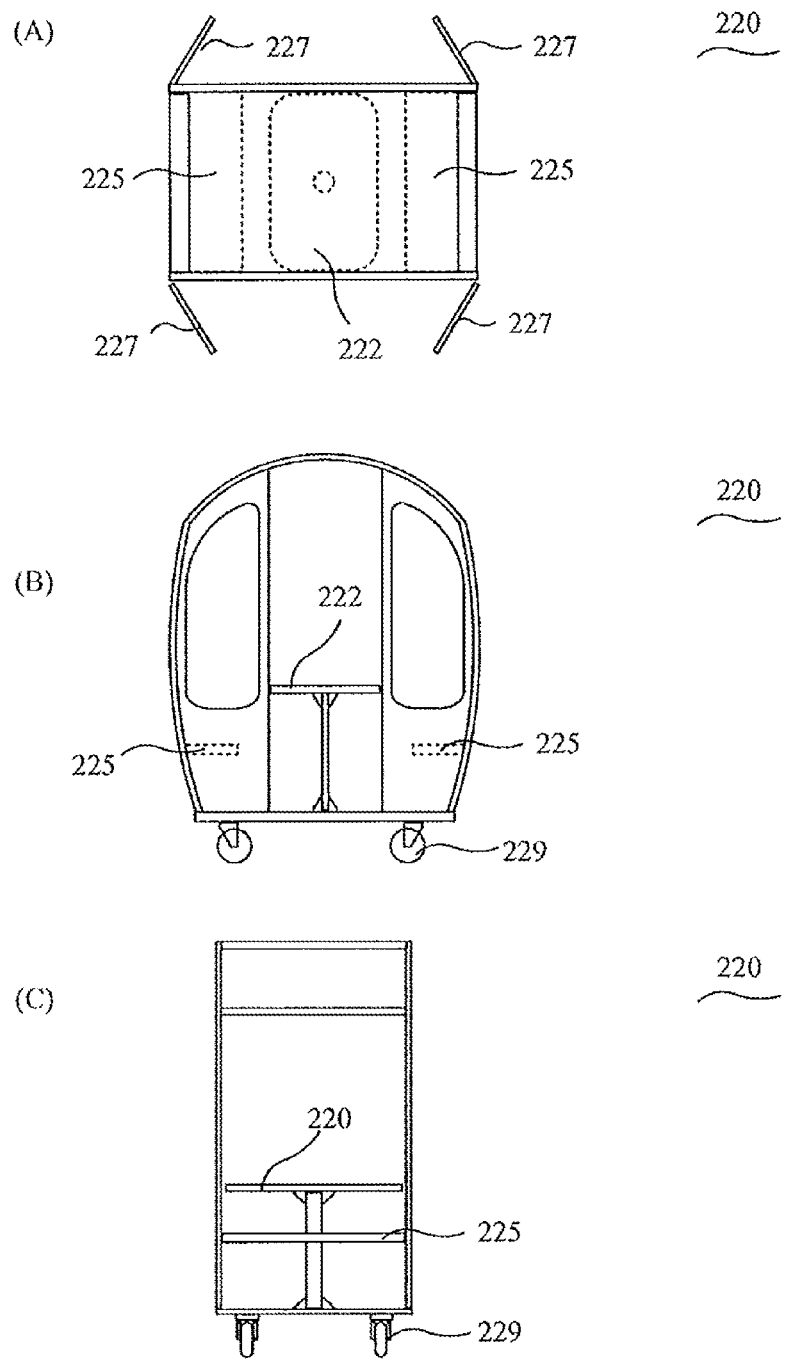
FIG. 2 is a top, side and front elevation view illustrating outlined configuration of a traveling wheeled vehicle provided to the facility in accordance with an embodiment of this Invention.
Figure 3:
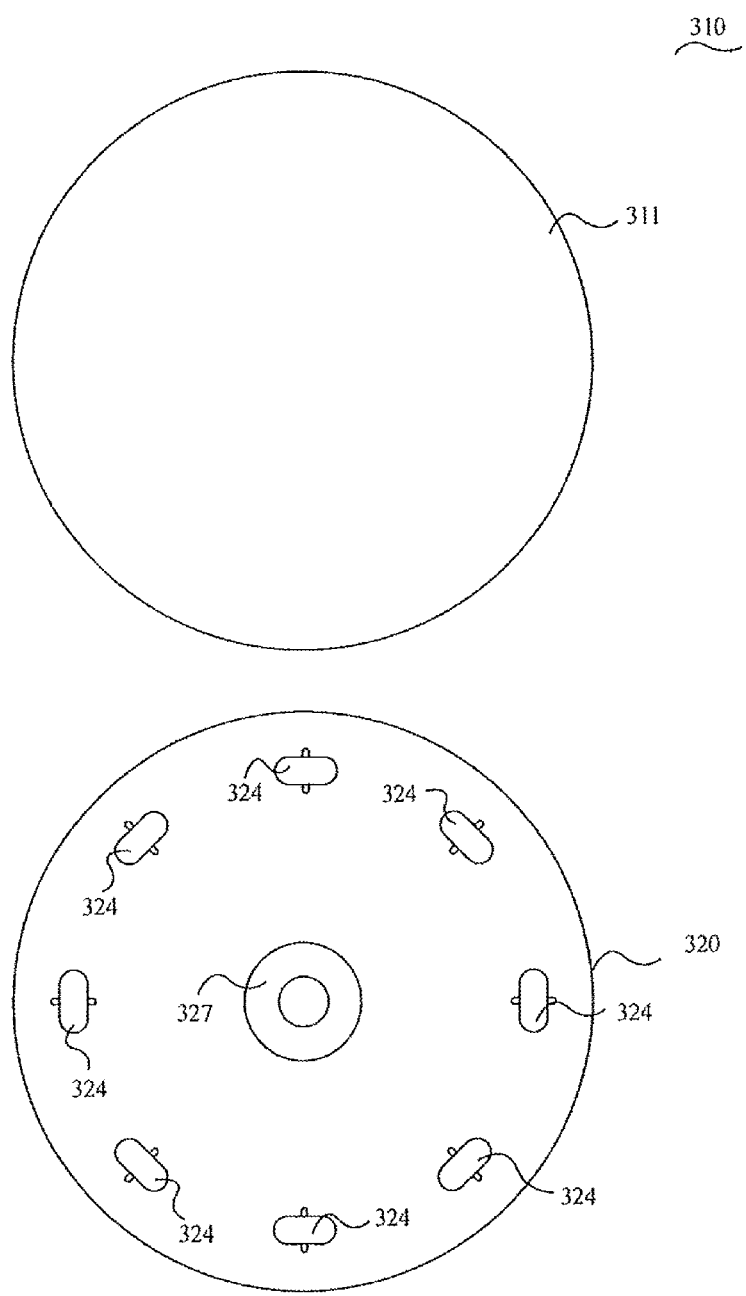
FIG. 3 is a top view illustrating outlined configuration of a rotating device provided to the facility in accordance with an embodiment of this Invention.
Figure 4:
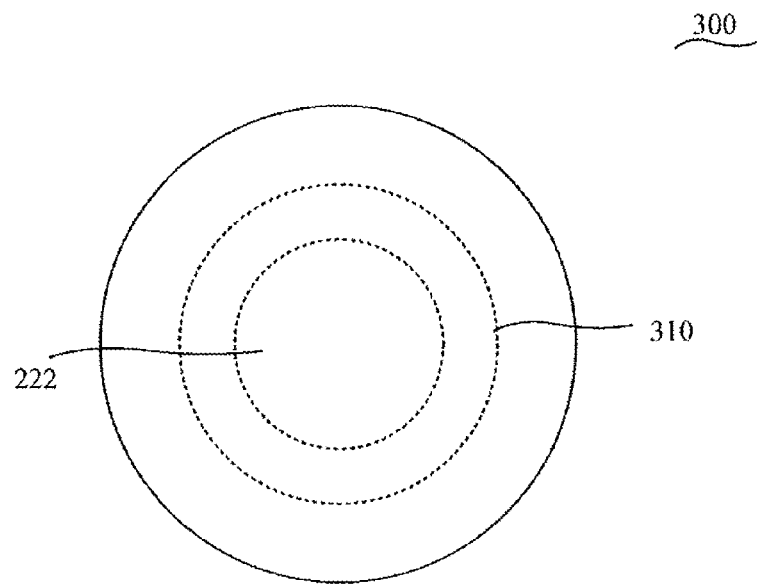
FIG. 4 is a top view and front elevation view illustrating outlined configuration of a rotating table provided to the facility in accordance with an embodiment of this Invention.
Figure 4:
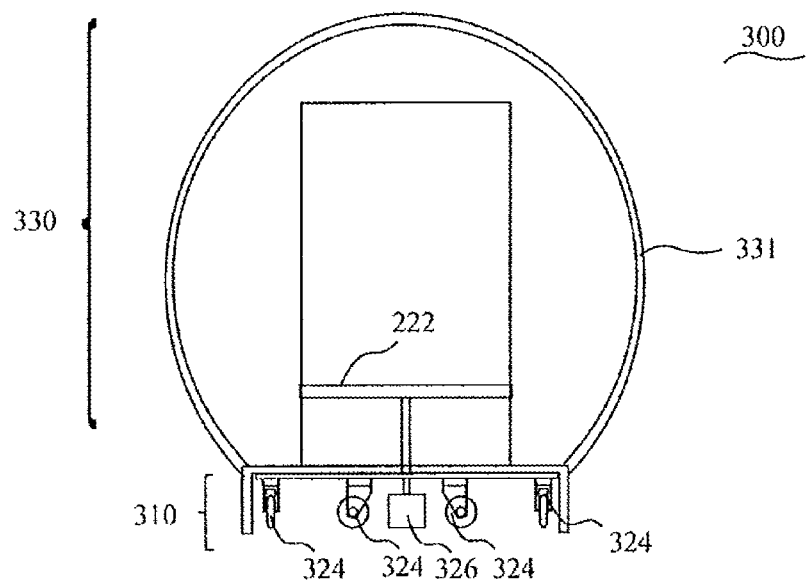
Figure 5:
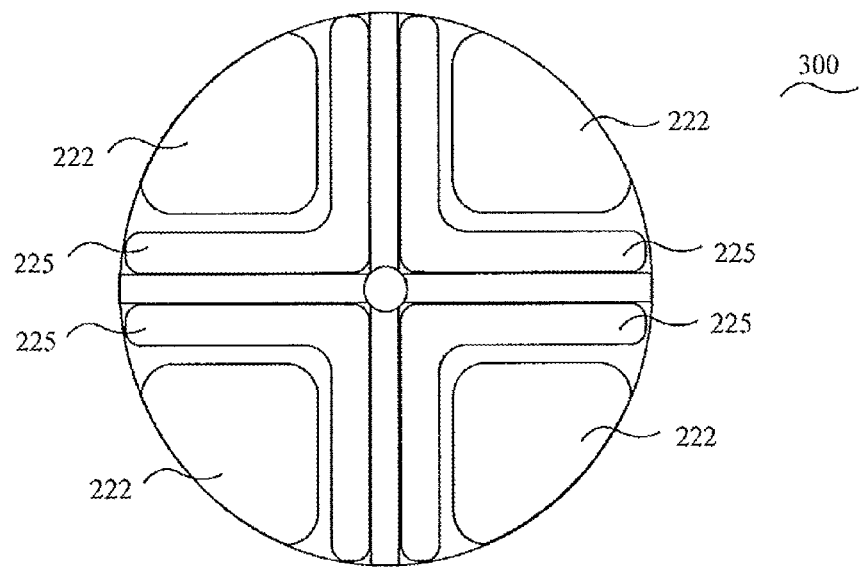
FIG. 5 is a top view and front elevation view illustrating an outlined configuration of a rotating table provided to the facility in accordance with an embodiment of this Invention.
Figure 5:
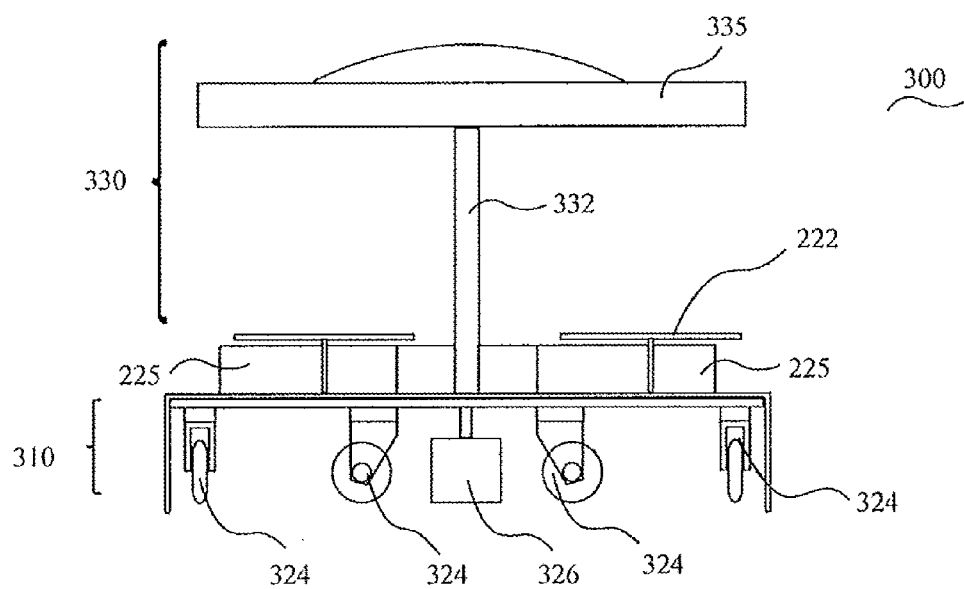

A specified embodiment of facility 100 is explained hereinafter with reference to the accompanying drawings. FIG. 1 is an outline schematic view showing a whole configuration of the facility 100 of the present invention, FIG. 2 is a drawing of a traveling wheeled vehicle 200 provided to the facility 100 of this invention. FIG. 3, FIG. 4, and FIG. 5 show a drawing explaining a rotating table 300 provided in the facility 100 of this invention. However, the details of the parts which do not directly-relate to the present invention will be omitted.

(Traveling Wheeled Vehicle)

In the facility 100 of this Invention, we assume the facility comprises a plurality of stores seen in a so-called food court using the shared seats. And, the facility 100 of this invention comprises a traveling wheeled vehicle 200 capable of travelling between seats in the facility 100, and comprises a table provided on a rotating device 310. At first, a traveling wheeled vehicle 200 is explained.

A traveling wheeled vehicle 200 of this invention comprises one leading vehicle 210 and one or more subsequent vehicles 220. A drive motor is provided to the leading vehicle 210. And the drive motor drives the driving wheel provided to the leading vehicle 210. A driver seat for seating of a driver driving the leading vehicle 210 is comprised to the leading vehicle 210, and furthermore a handle capable of controlling the driving wheel is provided to the position capable of operating in the driver seat.

A plurality of subsequent vehicles 220 are connected to the leading vehicle 210. For example, a configuration (joint member) capable of coupling the leading vehicle 210 or other subsequent vehicle 220 is provided at the outside of both ends of a subsequent vehicle 220. Furthermore, a subsequent seat 225 capable of sitting and a table 222 having a predetermined height is provided to the subsequent vehicle 220. Among subsequent vehicles 220, any one of the subsequent vehicles 220 connects to the leading vehicle 210 by the joint member, and the subsequent vehicle 220 of the latter part connects to said one subsequent vehicle 220. Traveling wheeled vehicle 200 of this Invention is configured by connecting the subsequent vehicles 220 required. In accordance with the present invention, a table 222 is provided in the subsequent vehicle 220, so the customers can eat in the subsequent vehicle 220. Furthermore, regarding a door of the subsequent vehicle 220, with the door closed, the door has a clearance gap capable of placing the cuisines on the table of vehicle 220. For example, a door on its left and right is formed of a double door, and with the double door closed, the table 222 in the vehicle 220 have a clearance gap of the degree capable of placing the cuisine plates.

Furthermore, a chair (subsequent seat) 225 is formed by attaching a seat board in such a way as to project from the side wall portion of the subsequent vehicle 220. A seat board is mounted on the side wall portion (a height at which customers can sit).

(Rotating Table)

As shown in FIG. 1, a rotating table 300 to eat in the state of rotating is provided in the facility 100 of this invention. For example, the rotating table 300 is configured by placing a table 222 and a chair 225 to the rotating device 310. That is, the table and chair rotates by rotating the rotating device 310. Above rotating device 310 comprise an upper rotating body and a bottom rotating body. The upper rotating body comprises top substrate 311 (FIG. 3 shows circle-shaped substrate 311, but if trouble-free against rotation, it may be a rectangle and a polyline shape). A rail (not shown) for rotating the after-mentioned casters 324 may be placed to the upper rotation body 311.

A bottom substrate 320 comprises a central gear 327, a drive motor 326 for driving the central gear 327, and a caster 324. At first, a central gear 327 is placed on a center location where the bottom substrate 320 (a circular shape is employed in this invention, but any shapes may be applied) for the bottom rotating body is seen from a top. Of course, an axis of revolution of the gear 327 is placed corresponding to the central axis of the bottom substrate 320. And a drive motor 326 is placed to the vicinities of the central gear 327 so that the center gear 327 is rotatable by the drive motor 326. A roller chain is wound on the center gear 327 and the rotation axis of the drive motor 326, and it is configured so that the center gear 327 rotates via the roller chain if the rotating shaft of the motor 326 rotates.

Furthermore, a plurality of casters 324 are placed to the bottom rotating body, in plane with the center gear 327 and the drive motor 326. Regarding the plurality of casters 324, opposing casters 324 are placed symmetrically to the center of bottom rotation body (bottom substrate), and adjacent casters are placed at equal intervals. The upper substrate 311 rotates depending on rotation of the casters 324. Therefore, the casters 324 of the bottom substrate 320 support the upper substrate 311, in the present invention.

Then, top substrate 311 and bottom substrate 320 are combined. At first, in the state upturning the surface where the casters 324, the center gear 327, and the drive motor 326 are placed, the bottom substrate 320 is placed on the floor. And, putting the center of the bottom substrate 320 on the top substrate 311, the upper substrate 311 is piled on the bottom substrate 320. At this time, the rotating device 310 of the present invention is formed by engaging the center gear 327 to the upper substrate 311 so that the upper substrate 311 rotates when center gear 327 of the bottom substrate 320 rotates. For maintenance, it is desirable that the center gear 327 is engaged removable to the upper substrate 311.

The rotating table 300 is configured by placing a table 222 and a chair 225 above the rotating device 310. As shown in FIG. 5, a roof 335 supported to a strut 332 may be placed to the rotating device 310. A switch (not shown) for operating the drive motor 326 is provided to the rotating device 310, and a rotating speed of the drive motor 326 may be configured to be controllable by the switch. Furthermore, in the present invention, the number of revolutions of drive motor 326 placed to bottom substrate 320 is controllable by inverter (not shown). A control unit stores the most suitable number of revolutions beforehand, and the drive motor 326 is rotationally driven based on the number of revolutions.

Furthermore, a torque limiter (not shown) and a slip ring are placed in the lower part of the central gear 327, and the rotation device 310 rotates via the torque limiter and slip ring. That is to say, a torque limiter for protecting the drive motor 326 from a surplus torque and a torque sensor for detecting running torque are provided between output shaft (mean rotating shaft) of the drive motor 326 and the center gear 327. As the torque sensor, a contact-type torque sensor may be used, alternatively a noncontact torque sensor may be used too. If a torque detected by the torque sensor is beyond an expected limit, a rotary power from the drive motor 326 is not transmitted to the central gear 327 by the torque limiter.

Figure 7:
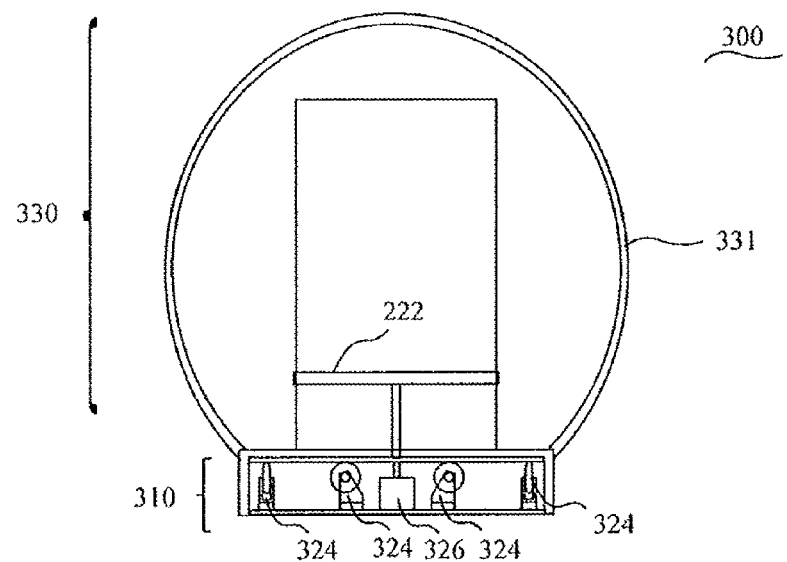
FIG. 7 is a front elevation view illustrating an outlined configuration of a rotating table provided to the facility in accordance with an embodiment of this Invention.
Figure 7:
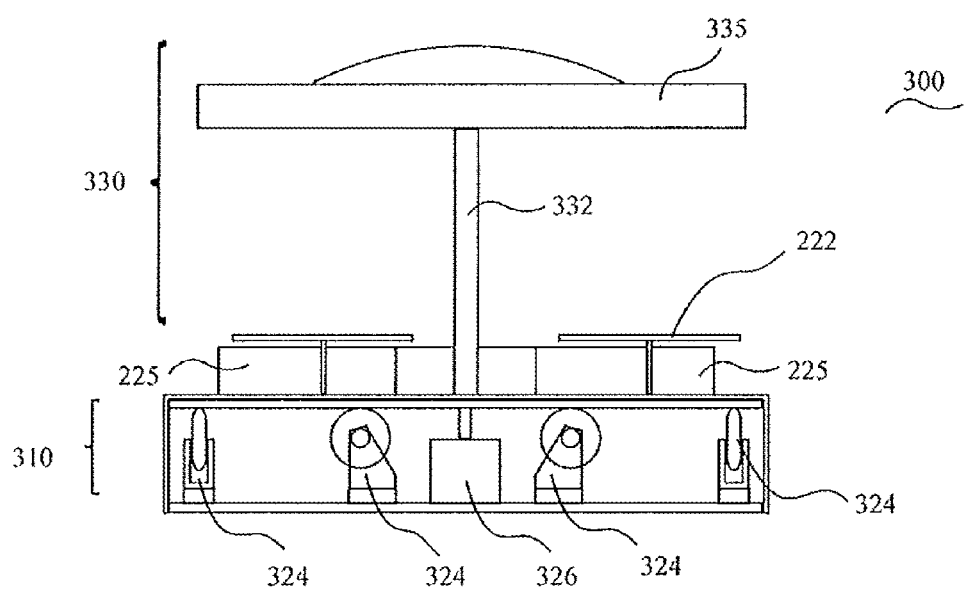

Instead of placing the drive motor 326 on the bottom substrate 320, the drive motor 326 may be fixed to the floor. For example, a drive motor 326 is fixed on floor by an anchor, and the caster 324 is fixed downward (the direction that a wheel of the caster 324 contacts with in floor) to the undersurfaces of the top substrate 311. The configuration that employed bottom substrate 320 is shown in FIG. 7, and configuration to fix the drive motor 326 to the floor in substitution for the bottom substrate 320 is shown in FIG. 4, FIG. 5.

Description of the Preferred Embodiment 2

The rotating table 300 that makes eccentric rotation can be configured by configuring the rotating device 310 used for preferred embodiment 1 as follows. Regarding the configuration other than after-mentioned eccentric shaft, it is same as the rotating table 300 described with detailed description of the preferred embodiment 1. Therefore, regarding the configuration except the eccentric shaft, drawing and illustration is omitted.

Figure 6:
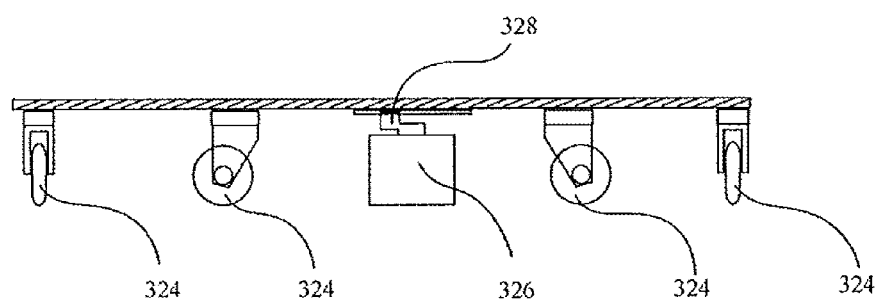
FIG. 6 is a front elevation view illustrating outlined configuration of a rotating device provided to the facility in accordance with an embodiment of this Invention.
Figure 6:
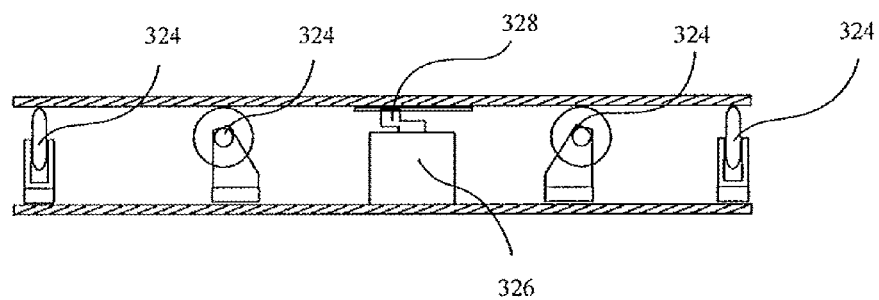

As shown in FIG. 6, after-mentioned eccentric shaft is used for the rotation axis of the drive motor 326. That is, as shown in FIG. 6(B), by providing an eccentric shaft (e.g., crank 328) comprising a handle for extending the shaft apart from the rotation axis of drive motor 326, the rotating shaft of the drive motor is displaced within a specified range. That is, one end of the crank 328 rotates on a same axis as the rotation axis of the drive motor 226, and the other end of the crank 328 makes eccentric rotation around the rotation axis (mean that it rotates around the position apart from the rotation axis). Of course, a switch (not shown) for operating a drive motor 326 is provided to the rotating device 310. A rotating speed of the drive motor 326 may be configured to be controllable by the switch. Of course, the rotating device 310 shown in FIG. 6 comprises an upper rotating body (top substrate 311) and a bottom rotating body (bottom substrate 320). And, the upper rotating body is a circle-shaped substrate, and the bottom rotating body comprises a center gear 327, a drive motor 326 for driving the center gear 327 and a caster 324, each caster 324 supports the upper rotating body.

A regulation means for regulating the auto-rotation of the upper rotating body can be provided. An elastic body (a rubber or a spring are preferably used) connecting between the bottom substrate 320 for placing the drive motor 326 and the upper rotating body 311 is used as the regulation means. If the regulation means can be configured to regulate auto-rotation of upper rotating body, any alignment method thereof is preferable. Instead of placing the drive motor 326 on the bottom substrate 320, the drive motor 326 may be fixed to the floor. For example, a drive motor 326 is fixed on floor by an anchor, a caster 324 is fixed downward (the direction that a wheel of the caster 324 contacts with in floor) to the undersurfaces of the top substrate 311.

Others Example of Detailed Description of the Preferred Embodiment

In the facility 100 of this invention, other than the traveling wheeled vehicle 200 and rotating table 300 explained with detailed description of the preferred embodiment 1 or 2, by placing the playground equipment such as iron rods, jungle gyms, overhead ladders, and seesaws and combination of the playground equipment, it can be configured as a facility 100 of the indoor amusement grounds type or method of attracting customers to an indoor amusement grounds-shaped facility.

INDUSTRIAL APPLICABILITY

This invention is either a facility comprising a plurality of stores that offer food and drink, and that treats customer seating for the plurality of stores as a shared space, or a method of attracting customers to said facility. And, a facility of this invention comprises a traveling wheeled vehicle and rotating table. Customers boards the traveling wheeled vehicle, and the vehicle can make a round trip in sharing space. The rotating table is configured to placing a table in the rotating device, and the rotating device comprises a lower rotating body and upper rotating body. The lower rotating body comprises a base substance, a central gear placed in the top center of base substance, and a drive motor which can rotationally drive the central gear. The upper rotating body is stacked to the lower rotating body while aligning their central axes, and the upper rotating body is supported by the caster provided in the lower rotating body in the state a wheel of the caster upturned. And, the traveling wheeled vehicle and the rotating tables are positioned in the shared space.

By above configuration, the upper rotation body rotates by the center gear rotated by center gear drive motor. Furthermore, by a caster's supporting the load coming from the upper part, the small rotation device strong about weight coming from the upper part can be easily configured thus without complicated mechanism. Furthermore, by placing the traveling wheeled vehicle in the sharing space, customers become able to board traveling wheeled vehicle, so the customers of families can be attracted in facility of this Invention coming with the aim of above rotating table and traveling wheeled vehicle, which makes them industrially useful.

What is claimed is:

1. A method of attracting customers to a facility comprising:
   providing a shared seating space;
   providing a traveling wheeled vehicle capable of carrying customers on a tour of the shared space;
   separately placing in the shared space a rotating device provided with an upper rotating body, a central gear, a drive motor capable of rotationally driving the center gear, and a caster structure for supporting the upper rotating body;
   providing a lower rotating body for supporting the drive motor of the rotating device;
   placing the upper rotating body relative to the lower rotating body so that their central axes are aligned;
   placing the caster structure for supporting the upper rotating body in a state so that a wheel of the caster structure is upturned;
   placing a crank on a rotating shaft of the drive motor, wherein a first end of the crank rotates about and is coaxial with a drive motor rotation axis and a second end of the crank is spaced from and parallel to the rotating shaft, the second end of the crank rotating about a second rotation axis that is spaced from the drive motor rotation axis;
   rotationally driving the rotating shaft and crank, wherein the second end of the crank causes the upper rotating body to rotate eccentrically; and
   placing a table and a chair in the rotating device.

2. The method according to claim 1, further comprising a table provided in the traveling wheeled vehicle.

3. A method of attracting customers to a facility comprising:
   providing a shared seating space;
   providing a traveling wheeled vehicle capable of carrying customers on a tour of the shared space;
   separately placing in the shared space a rotating device provided with an upper rotating body, a central gear, a drive motor capable of rotationally driving the center gear, and a caster structure for supporting the upper rotating body;
   placing a crank on a rotating shaft of the drive motor, wherein a first end of the crank rotates about and is coaxial with a drive motor rotation axis and a second end of the crank is spaced from and parallel to the rotating shaft, the second end of the crank rotating about a second rotation axis that is spaced from the drive motor rotation axis;
   rotationally driving the rotating shaft and crank for causing the upper rotating body to rotate eccentrically; and
   placing a table and a chair in the rotating device.

4. The method according to claim 3, wherein the drive motor is fixed to a floor.

5. The method according to claim 3, further comprising:
   providing a lower body for supporting the drive motor of the rotating device;
   placing the upper rotating body relative to the lower rotating body so that their central axes are aligned; and
   placing the caster structure for supporting the upper rotating body in a state so that a wheel of the caster structure is upturned.

6. A facility comprising:
   infrastructure for offering food and drink;
   shared seating space;
   a traveling wheeled vehicle capable of carrying customers on a tour of the shared space;
   a rotating device separately positioned in the shared space provided with an upper rotating body, a central gear, a drive motor capable of rotationally driving the center gear, and a caster structure for supporting the rotating body; and
   a table and a chair in the rotating device,
   wherein
   the rotating device is provided with a lower body supporting the central gear and drive motor;
   said upper rotating body is stacked relative to the lower rotating body so that their central axes are aligned;
   the rotating device further comprises a crank on a rotating shaft of the drive motor, wherein a first end of the crank rotates about and is coaxial with a drive motor rotation axis and a second end of the crank is spaced from and parallel to the rotating shaft, the second end of the crank rotating about a second rotation axis that is spaced from the drive motor rotation axis such that rotation of the rotating shaft and crank causes the upper rotating body to rotate eccentrically; and
   the caster structure for supporting the upper rotating body is in a state so that a wheel of the caster structure is upturned.

7. The facility according to claim 6, wherein a table is provided in the traveling wheeled vehicle.

8. A facility comprising:
   infrastructure for offering food and drink;
   shared seating space;
   a traveling wheeled vehicle capable of carrying customers on a tour of the shared space;
   a rotating device separately positioned in the shared space provided with an upper rotating body, a central gear, a drive motor capable of rotationally driving the center gear, and a caster structure for supporting the rotating body;
   a table and a chair in the rotating device; and
   a crank placed on a rotating shaft of the drive motor wherein a first end of the crank rotates about and is coaxial with drive motor rotation axis and a second end of the crank is spaced from and parallel to the rotating shaft, the second end of the crank rotating about a second rotation axis that is spaced from the drive motor rotation axis such that rotation of the shaft and crank causes the upper rotating body to rotate eccentrically.

9. The facility according to claim 8, wherein the drive motor is fixed to a floor.

10. The facility according to claim 8, wherein
    the rotating device is provided with a lower body supporting the central gear and drive motor;
    said upper rotating body is stacked relative to the lower rotating body so that their central axes are aligned; and
    the caster structure for supporting the upper rotating body is in a state so that a wheel of the caster structure is upturned.

* * * * *